(12) United States Patent
Liesener

(10) Patent No.: US 7,878,693 B2
(45) Date of Patent: Feb. 1, 2011

(54) APPROACH LIGHT WITH LIGHT PATTERN

(75) Inventor: Alf Liesener, Schorndorf (DE)

(73) Assignee: SMR Patents S.a.r.l., Luxembourg (LU)

( * ) Notice: Subject to any disclaimer, the term of this patent is extended or adjusted under 35 U.S.C. 154(b) by 0 days.

(21) Appl. No.: 12/341,020

(22) Filed: Dec. 22, 2008

(65) Prior Publication Data

US 2009/0161379 A1 Jun. 25, 2009

(30) Foreign Application Priority Data

Dec. 21, 2007 (EP) .................................. 07123890

(51) Int. Cl.
*B60Q 1/26* (2006.01)
(52) U.S. Cl. ...................................... 362/494; 362/293
(58) Field of Classification Search ................. 362/494, 362/293, 539
See application file for complete search history.

(56) References Cited

U.S. PATENT DOCUMENTS

| 5,233,375 | A  | * | 8/1993  | Williams et al. ............... 353/43 |
| 6,299,333 | B1 |   | 10/2001 | Pastrick et al. |
| 6,623,124 | B2 | * | 9/2003  | Okura ........................... 353/43 |
| 6,926,431 | B1 | * | 8/2005  | Foote et al. ................... 362/494 |
| 7,438,453 | B2 | * | 10/2008 | Saitoh et al. ................. 362/494 |
| 2001/0043313 | A1 | * | 11/2001 | Okura ........................... 353/97 |
| 2004/0257824 | A1 |   | 12/2004 | Assinder et al. |
| 2005/0117364 | A1 | * | 6/2005  | Rennick et al. ............. 362/540 |
| 2007/0109807 | A1 |   | 5/2007  | Lynam et al. |

FOREIGN PATENT DOCUMENTS

| EP | 1304260   | 4/2003 |
| EP | 1690736   | 8/2006 |
| EP | 1738959   | 1/2007 |
| GB | 2341365   | 3/2000 |
| GB | 2342212   | 4/2000 |
| WO | 2005035308 | 4/2005 |

OTHER PUBLICATIONS

European Search Report for EP 07123890 dated Jun. 5, 2008.

* cited by examiner

*Primary Examiner*—Ali Alavi
(74) *Attorney, Agent, or Firm*—Reising Ethington P.C.

(57) ABSTRACT

The invention is related to a rear view mirror assembly with a mirror base attached to a vehicle and a mirror head. The mirror head is formed to host a reflective element and an approach light, the approach light is positioned in the lower side of the mirror assembly to light up an area adjacent to the vehicle. The approach light includes a mask to allow the projection of the pattern adjacent to the vehicle. In more detail the invention is related to a way to project a pattern adjacent to a vehicle.

10 Claims, 7 Drawing Sheets

APPROACH LIGHT WITH LIGHT PATTERN

BACKGROUND OF THE INVENTION

The invention is based on a priority patent application EP 07123890.1 which is hereby incorporated by reference.

The invention is related to a rear view mirror assembly with a mirror base attached to a vehicle and a mirror head. The mirror head is formed to host a reflective element and an approach light, the approach light is positioned in the lower side of the mirror assembly to light up an area adjacent to the vehicle. The approach light includes a mask to allow the projection of the pattern adjacent to the vehicle.

In more detail the invention is related to a way to project a pattern adjacent to a vehicle.

Approach or security lights are known since long. Personal security in and around vehicles has become an important concern. While remote-operated, keyless entry systems have been incorporated in vehicles in order to unlock the vehicle and illuminate interior lights, such systems merely expedite entry to the vehicle and do not, per se, enhance security around the vehicle. Accordingly, a need exists for a vehicle security system to increase the security for vehicle occupants while entering and exiting the vehicle. Any such system would need to be aesthetically pleasing and not burdensome in use.

In addition, the security light desirably must be capable of matching a multiplicity of mirror housing designs. Moreover, the security light desirably is compact so as to fit into the interior cavity of conventional exterior mirror housings. For styling and aerodynamic reasons, exterior mirror housings are of determined and restricted size, shape, design, and interior volume. Moreover, the interior volume is already typically relatively cramped as it must accommodate not only the mirror reflector element itself and its movement, but also usually a manual or electric actuator that allows adjustment of the rearward field of view of the reflector remotely by the driver from the interior cabin of the vehicle. Also, since it is commercially desirable for a manufacturer of a security light to supply to a multitude of exterior mirror manufacturers, for their incorporation into their own particular exterior mirror assembly construction, it is desirable that the light be of a module type that is compact; that is weatherproofed; that is attachable and receivable by a wide variety of exterior mirror assembly designs; that is readily, standardly, and conveniently connectable to the vehicle electrical service and wiring already commonly found in conventional exterior mirror assemblies.

Furthermore, the light source should be replaceable without removing and subsequently replacing numerous fasteners. Such fasteners are not only time-consuming to remove and replace, but are subject to getting lost as well as damaged.

Additionally, it would be desirable to provide a security light system having a light module designed which could be universally adaptable to the exterior mirrors on both sides of the vehicle. The task is complicated because the light pattern illuminating the ground, such as adjacent the front and rear doors, on one side of the vehicle is generally desirably a mirror image of the ground illumination light pattern on the other side of the vehicle. Both light patterns extend outwardly from the respective side of the vehicle to a lateral outer boundary, but in opposite directions.

In the U.S. Pat. No. 6,299,333 discloses an exterior rearview mirror assembly security system for a vehicle including an exterior mirror assembly. The exterior mirror assembly includes a security light assembly, which projects a pattern of unstructured light from the assembly on an area adjacent a door of the vehicle in order to create a lighted security zone in the area. The security light assembly includes an enclosure, with a light-transmitting opening in the enclosure, and a light source for radiating light through the light-transmitting opening. The security light assembly also includes a cover for the light-transmitting opening, which comprises an optical lens having a non-planar optical surface.

The security light assembly in prior art allows to project a smooth light pattern on the ground adjacent to the vehicle.

In the EP 1690736 A1 a couple of lighting elements in a mirror are disclosed. In FIGS. 124A and 124B a security light is included that allows to project a pattern onto the ground.

In this prior art the light pattern is structures by using several independent light sources with overlapping light pattern.

SUMMARY OF THE INVENTION

The invention allows an aesthetical projection of a logo or a sign adjacent to a vehicle without using complicated light source arrangements. The light pattern is structured by using a mask that.

The simple arrangement allows the use of individual or brand related masks that are build in permanent or changeable. This opens road field in which customers are allowed to individualize their products or for person to individualize a car.

For this purpose a mask is fixed in the optical path of a light source to allow projecting the silhouette of the sign that is graved in or printed on the mask.

It is of advantage to have a lighted projecting and only a dark silhouette of the sign not to loose to much light power.

In another arrangement also the negative projection could be of advantage if the sign is including a lot of structures.

It is of advantage to put the invention security light into the mirror head to achieve a good pattern.

It is also of advantage to place the approach light into the mirror bracket where it is placed unmoveable in cases the mirror is folded in a parking position.

It also of advantage if the mask does not fill the whole lens area but is limited to a part of the lens, this allows a divided lighting structure with a approach light with a smooth light pattern and a mask structured approach light including the sign projection.

SHORT DESCRIPTION OF THE DRAWINGS

DETAILED DESCRIPTION OF THE DRAWINGS

Figure 1:
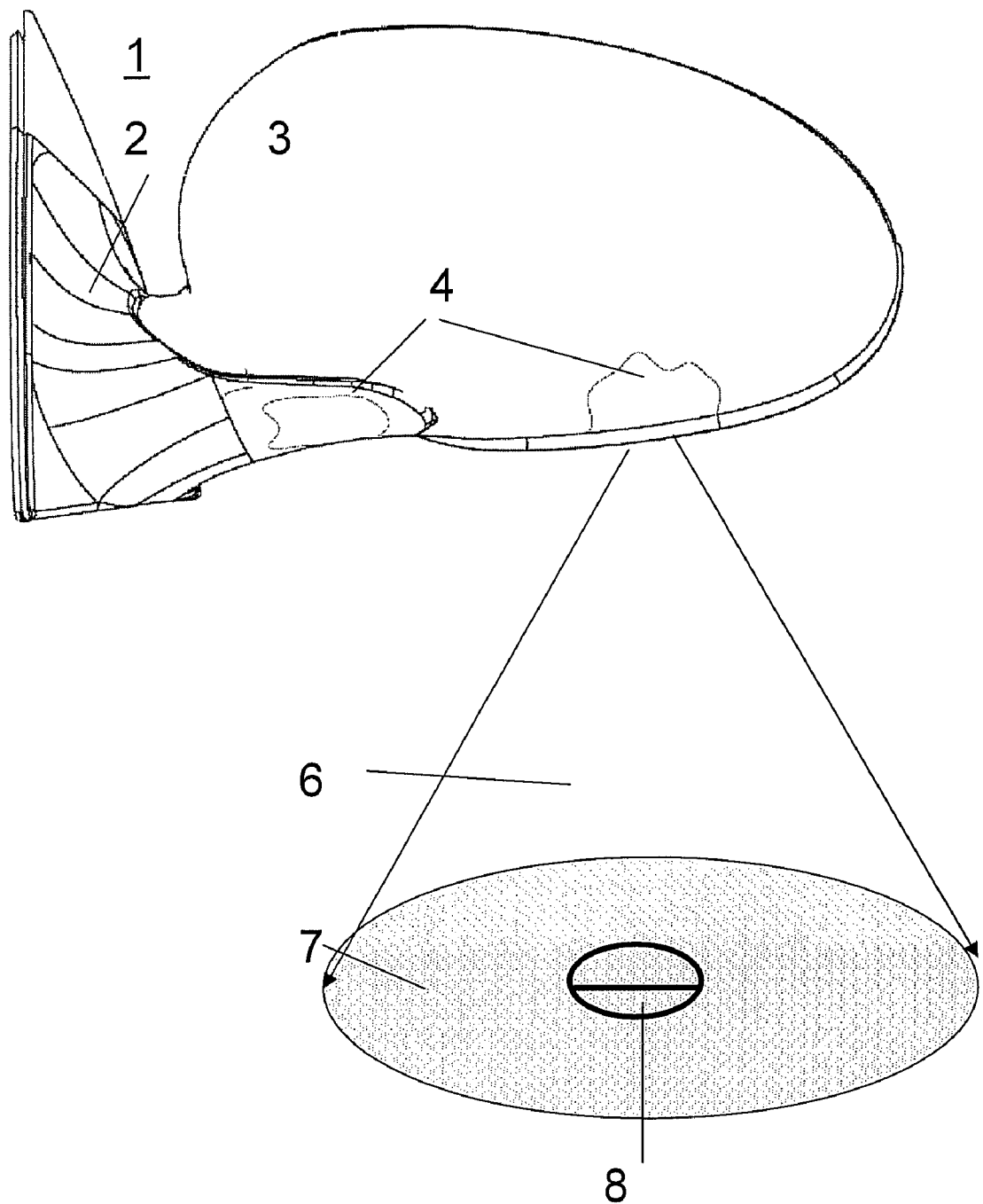
FIG. 1 shows a schematic rear view mirror with inventional solution

FIG. 1 shows a representative mirror assembly 1 which is in this example a two part mirror with a foldable axis comprising a mirror base 2 and a mirror head 3. The mirror head includes an indentation with a reflective element, not shown in this figure. FIG. 1 shows a front view of the rear view mirror assembly. The rear view mirror assembly includes a approach light 4 shown in two different positions in the mirror base and the mirror head. The approach light in the mirror head emits light defined by a cone 6. The light projects a light pattern 7 on the ground which is commonly adjacent to the vehicle, but can also impinge the vehicle contour.

The sign 8 is in this example a dark shape in a lighted area 7.

Figure 2:
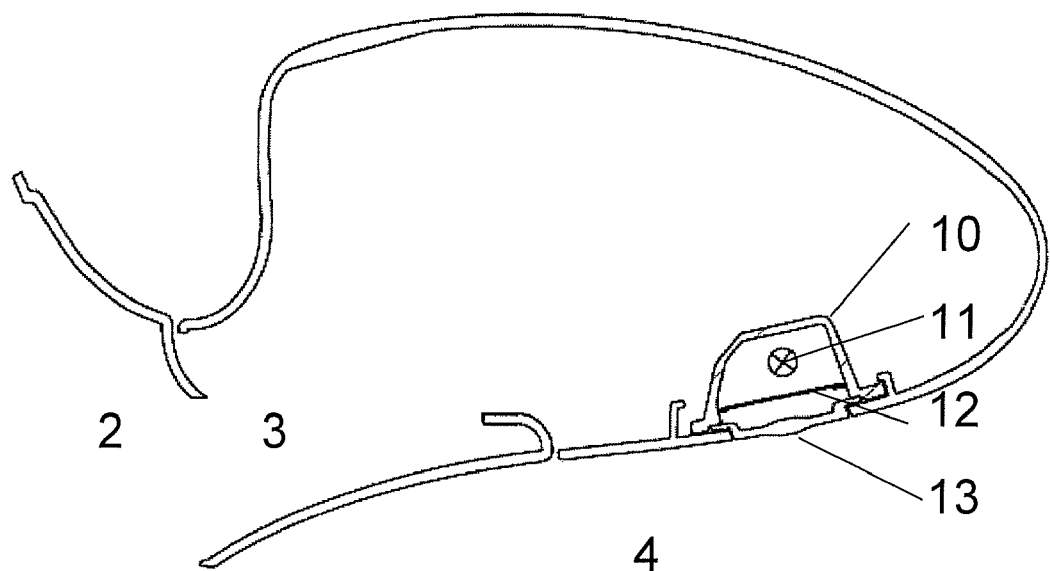
FIG. 2 shows a cross section of a mirror head with a first embodiment

FIG. 2 shows a first embodiment of a approach light in a rear view mirror. The approach light is positioned in the below part of the mirror housing. In the cross section of the mirror housing the approach light module 4 is visible it comprised of a light source 10 a mask 12 allocated in the enclosure of the approach light and a lens used as a protection window and an optical mean to project the pattern on the ground. Normally the approach light will be lighted by a LED that has a live time comparable to the life time of the vehicle. So an exchange possibility of the light mean is not mandatory. The mask is positioned in the light path between the lighting mean 11 and the lens 13 and fixed in the enclosure of the approach light. The mask could be fixed with clips to achieve changeability. In another embodiment the mask is fixed by welding the mask into the enclosure. The light source is in this figure represented by a single source but the light source can also be realized in using a set of LEDs to improve the light beam quality the colour or the defined pattern of light.

Figure 3:
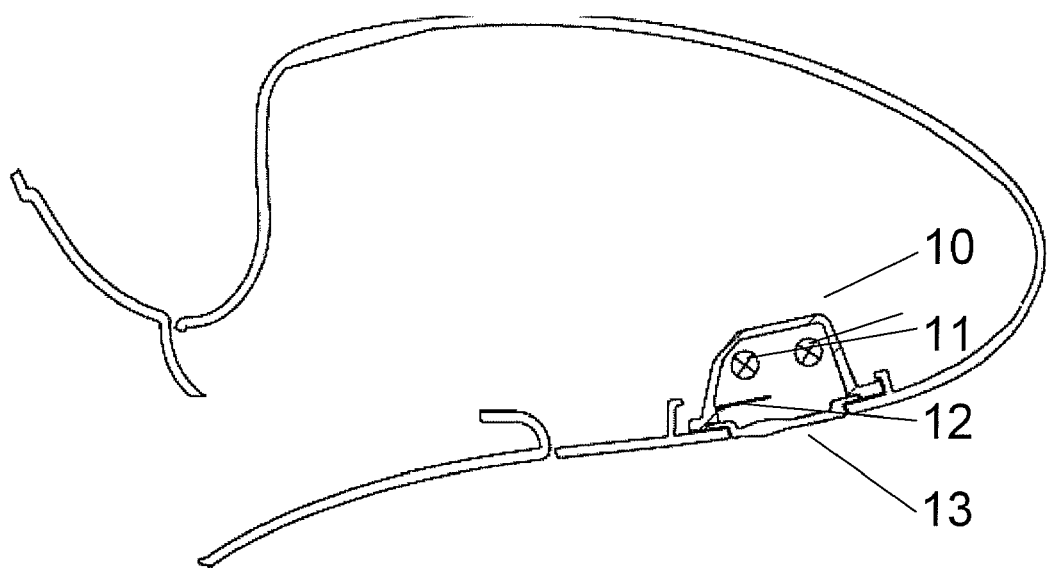
FIG. 3 shows a cross section of a mirror head with a second embodiment
Figure 4:
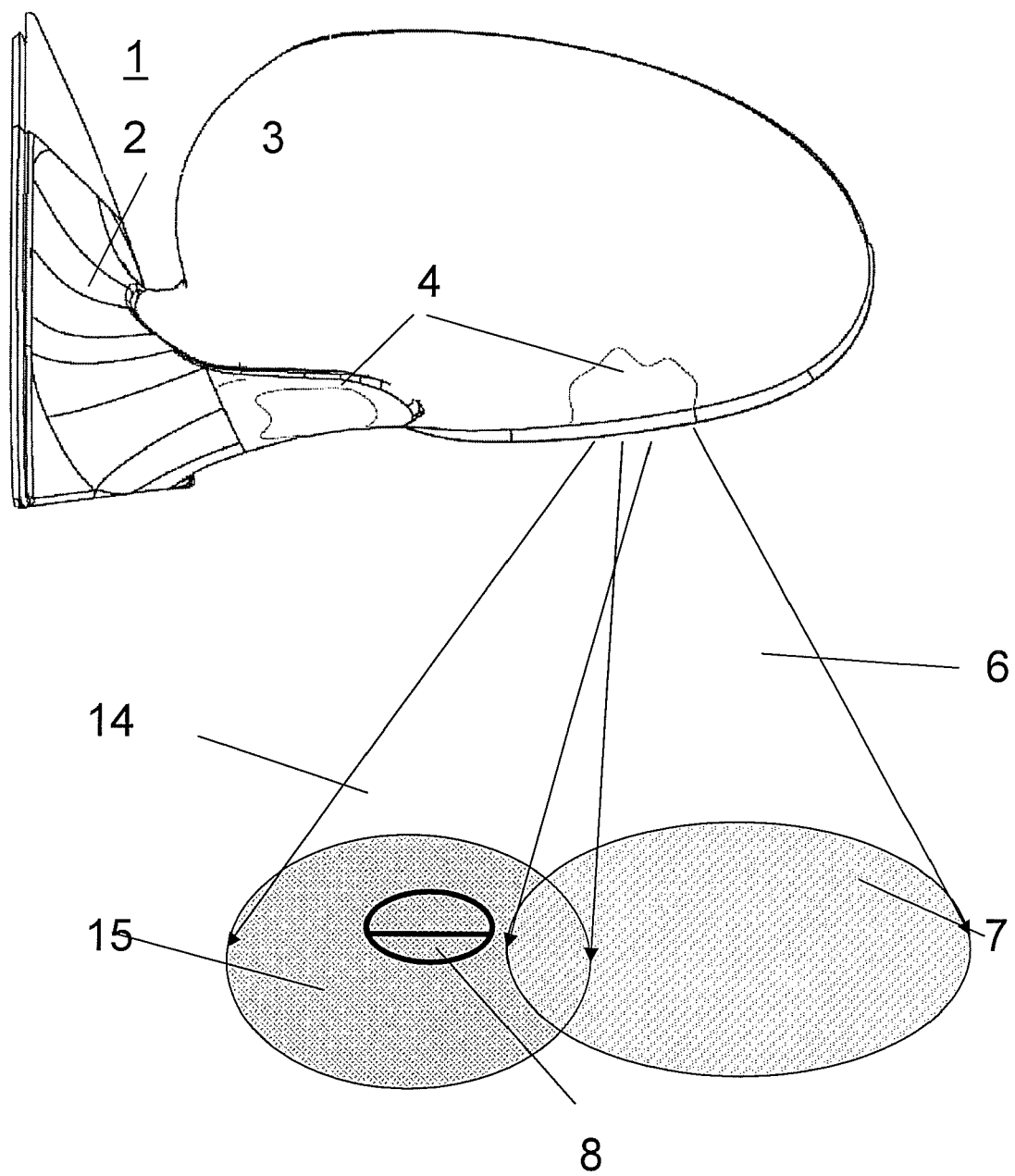
FIG. 4 shows a mirror with the related projection pattern

FIG. 3 shows a second embodiment of the invention. In this figure the mask 12 is not filling the whole area of the lens 13 but only a part of the light path of the light sources. In this embodiment two light sources are used to create individual paths, a first path through the mask 12 and a second path without mask influence. In an alternative embodiment the two light sources are replaced by sets of light sources. The use of the two different light paths is shown in FIG. 4. The light path of the second light source undisturbed by a mask projects t smooth light pattern 7 on the ground. The first light source with the mask in the light path projects a light pattern 15 on the ground including a sign 8.

Figure 5:
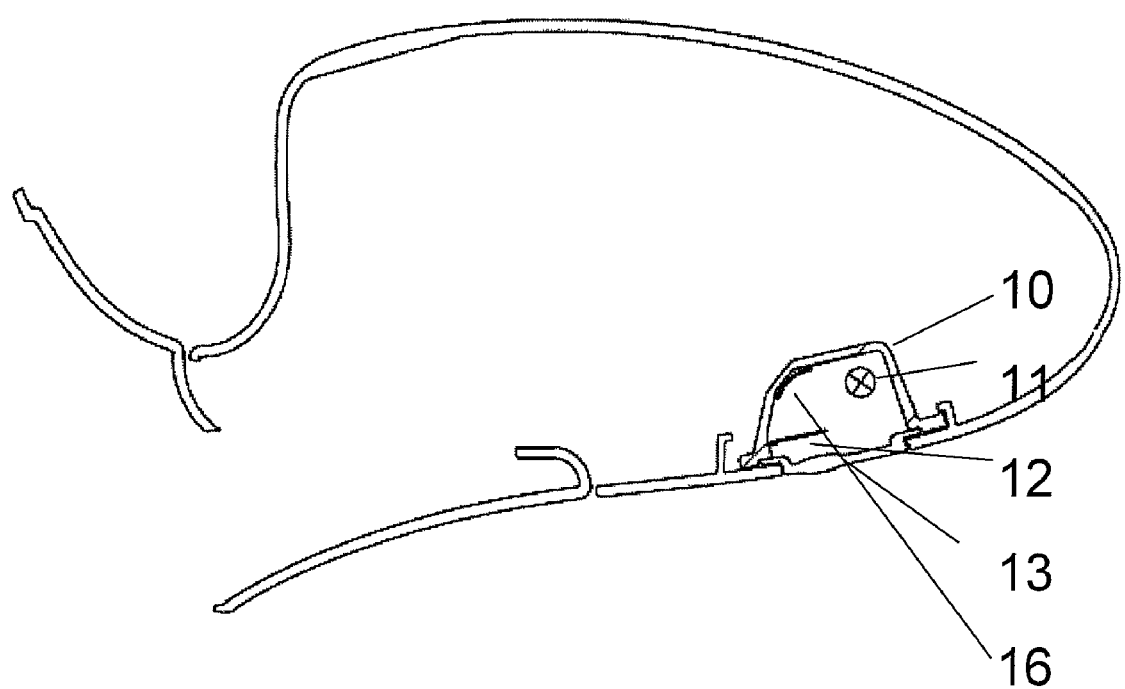
FIG. 5 shows a cross section of a mirror head with a third embodiment

FIG. 5 shows a third embodiment that allows projecting a pattern as shown in FIG. 4. Here a single light source is used to light the light path with the mask and without the mask 12. To support a better distribution of light the enclosure of the approach light is lined with reflecting means at least at the surface close to the mask structure. The reflecting means are a reflecting coating on the surface of the enclosure or a separate reflector designed to ease light projection on the ground.

Figure 6:
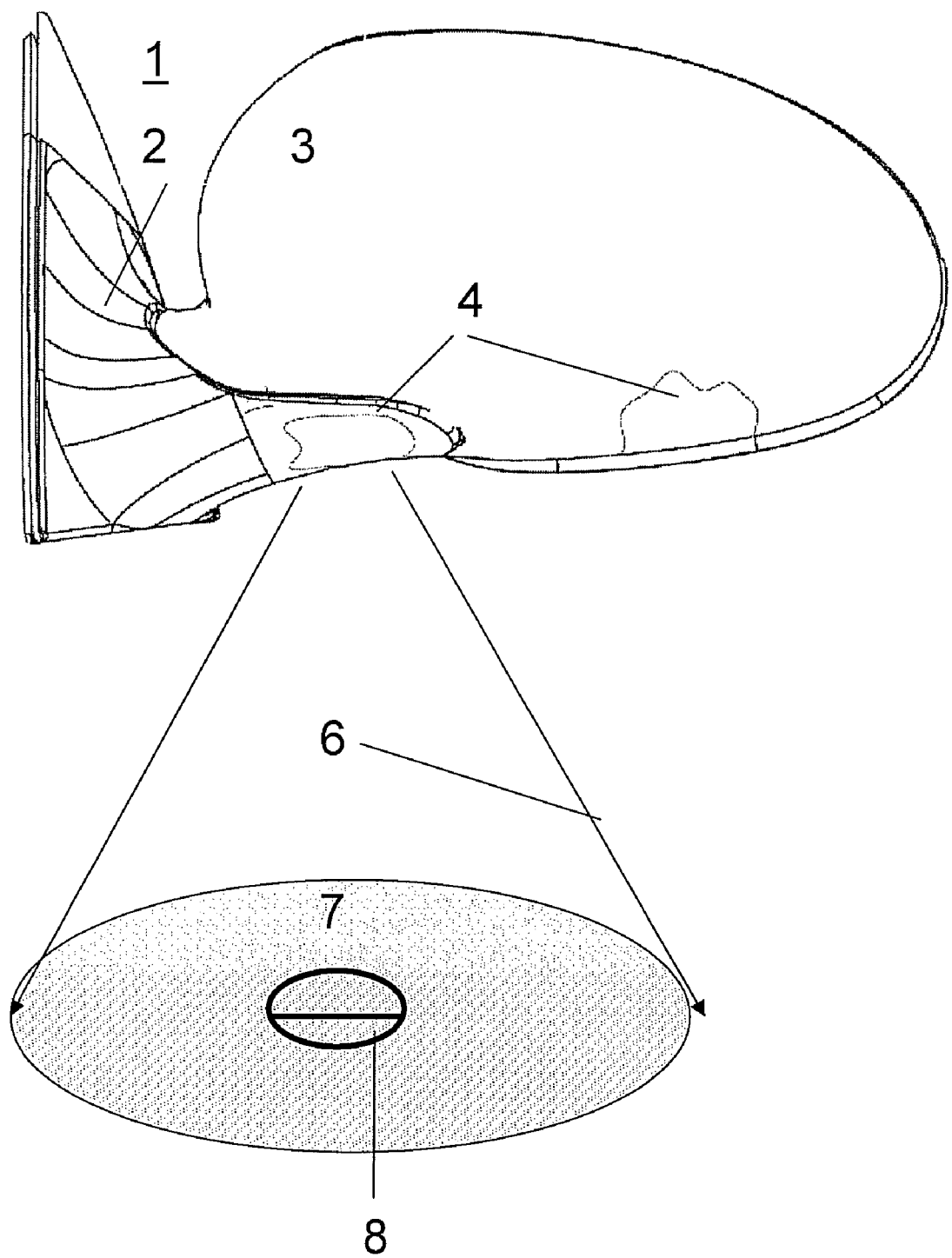
FIG. 6 shows a rear view mirror with a different approach light position
Figure 7:
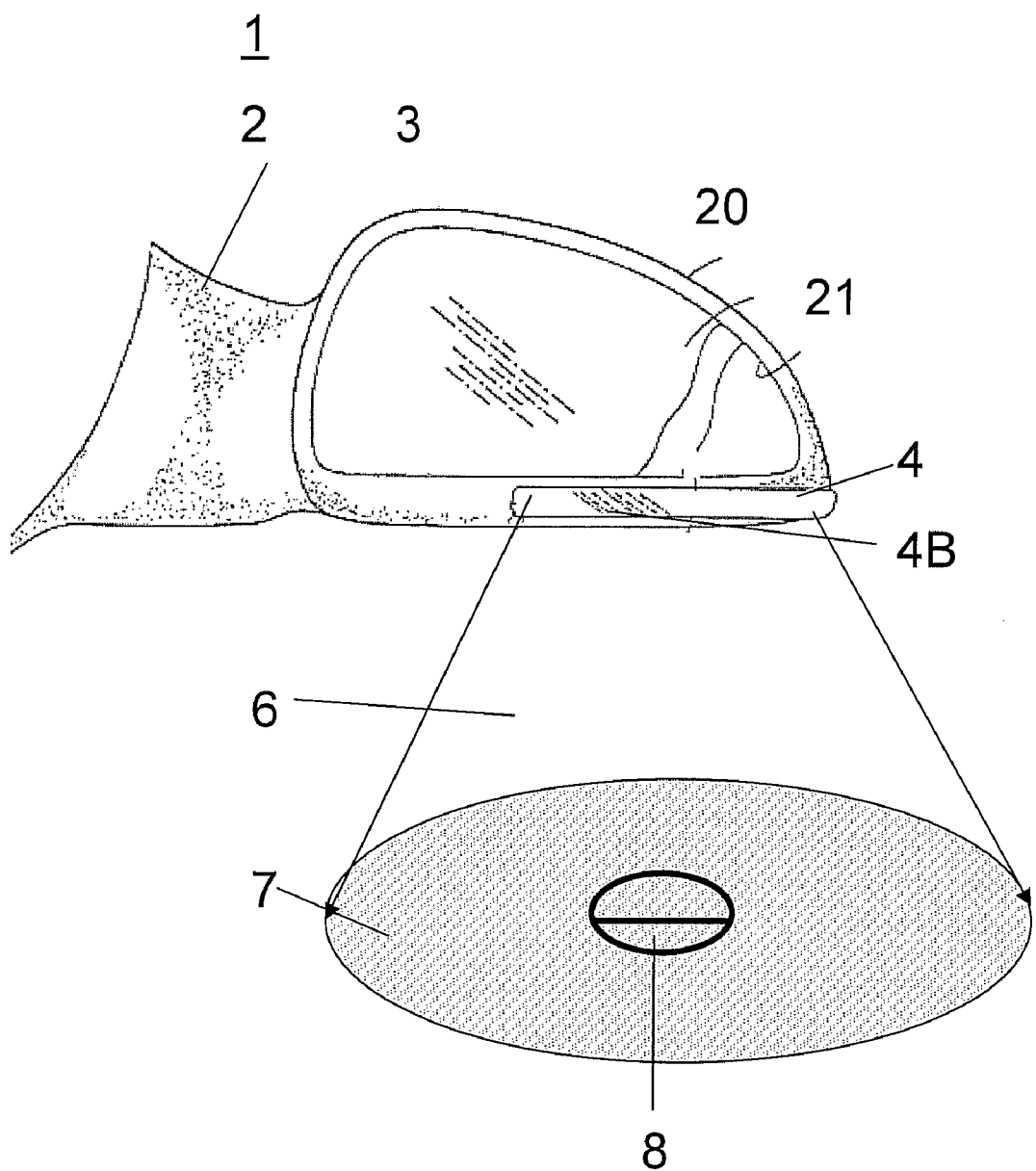
FIG. 7 shows a different design for the approach light

FIG. 6 shows the inventional approach light at a position in the mirror base of the mirror assembly. This position is also possible for all embodiments discussed before. FIG. 7 shows an implementation that includes a mirror with a reflecting element 21 in a mirror head with a bezel 20 around the reflecting element with several light function in the lower part of the mirror housing. For example a turn signal light 4A is combined with an approach light 4 in the same module. This module can also comprise additional signal lights and sensor functions.

Figure 8A:
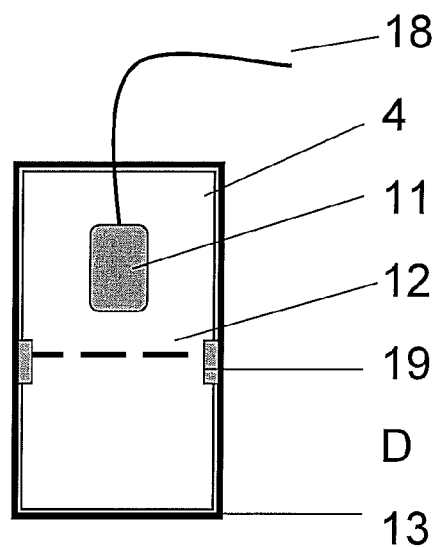
FIG. 8 shows examples of the approach light with the mask
Figures 8B, 8C, 8D:
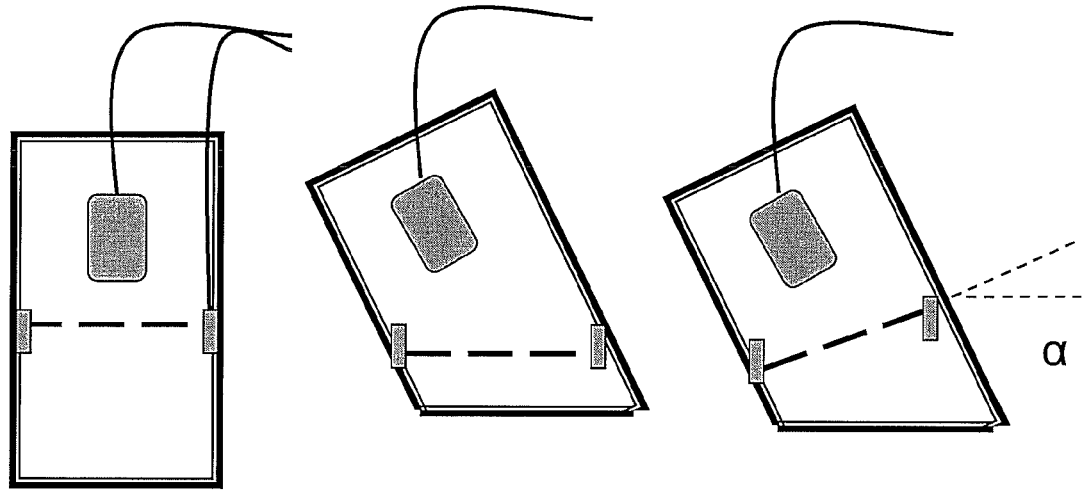

FIG. 8 shows schematic version of the approach light 4. In FIG. 8A the approach light comprises a light source 11 a mask 12 fixed with fixing means 19 and a lens 13. The distance between the mask and the lens is D. This distance depends on the projection quality and the design of the sign or logo that must be projected. The distance D can vary between 10 mm and 0 mm. The light source 11 is electrically connected with a connection 18 to the electrical system of the whole mirror and the vehicle. In FIG. 8B the mask 12 is also electrically connected. This shows an implementation in which the mask is not a passive filter as a slide. In this implementation the mask is an active tool as a LCD display or another electro optical device. Such an active mask has the advantage that the sign is adaptable to individual wishes.

In addition the active mask allows the compensation of projection mismatching in an easier way. Normal projection will be influenced by the direction the approach light is build into the rear view mirror assembly. In FIG. 8C a slightly angled version is described. If the mask is fixed parallel to the lens 13 the sign that must be projected to the ground is distort. To avoid a bad reproduction a passive mask must have a pre-distortion of the sign. The active mask allows implementing this pre-distortion immediately by an update of the LCD display. In the embodiment of FIG. 8D the mask is arranges in an angle alpha from the lens. Also here the pre-distortion of the sign in the mask must be adapted to the angel and the light path of the light source.

The invention claimed is:

1. Rear view mirror assembly with a mirror base attached to a vehicle and a mirror head, the mirror head is formed to host a reflective element and an approach light the approach light is positioned in the lower side of the mirror assembly to light up an area adjacent to the vehicle, the approach light includes at least one light source and a lens, characterized in that the approach light includes a mask to allow the projection of a pattern adjacent to the vehicle and the mask is arranged in the light path in a distance (D) from the lens, and disposed at a non-parallel angle (Alpha) from the lens such that the pattern can be projected onto the ground without interference from the vehicle.

2. Rear view mirror according claim 1 wherein the approach light is positioned in the mirror head.

3. Rear view mirror according claim 1 wherein the approach light is positioned in the mirror base.

4. Rear view mirror according claim 1 wherein the approach light includes at least one light source and the mask is filling the opening of the approach light lens.

5. Rear view mirror according claim 1 wherein the approach light includes two sets of light sources and the mask is limited to the light beam of one set of light sources.

6. Rear view mirror according claim 1 wherein the approach light includes one set of light sources and the mask is limited to a part of the opening of the approach light and the housing of the approach light is lined by a reflector mean.

7. Rear view mirror according claim 1 wherein the patterned mask is structured as a positive pattern of a logo or sign.

8. Rear view mirror according claim 1 wherein the patterned mask is structured as negative pattern of a logo or sign.

9. Rear view mirror according claim 1 wherein the approach light is combined with other signal lights.

10. Rear view mirror according claim 1 wherein the mask is an electro chromatic material with pixels triggered to define a sign structure.

* * * * *